P. GOLLNER.
PLUMBER'S TRAP.
APPLICATION FILED JAN. 18, 1911.
1,000,087.
Patented Aug. 8, 1911.
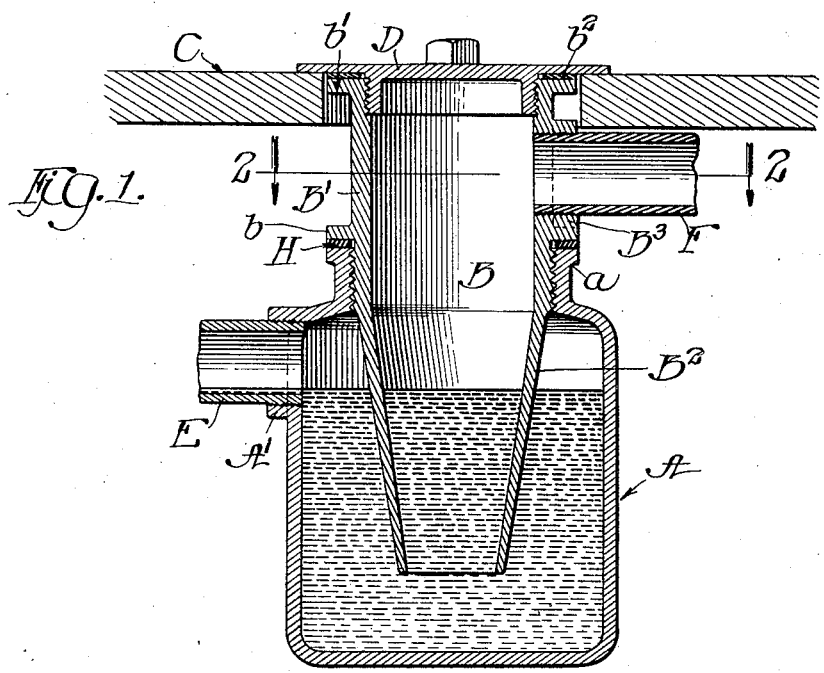
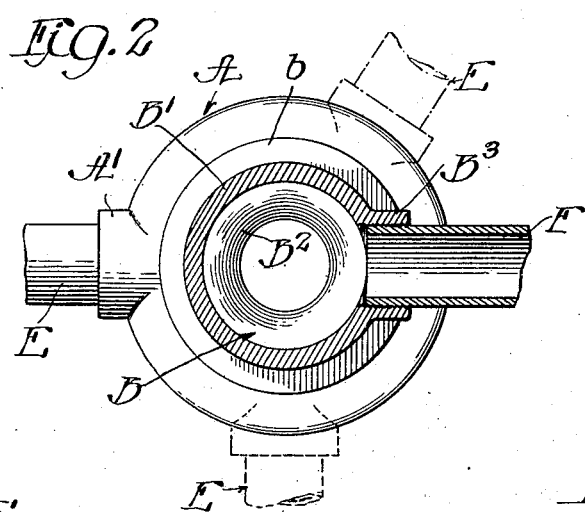
Witnesses:
Inventor
Philip Gollner
by Poole & Brown Attys

UNITED STATES PATENT OFFICE.

PHILIP GOLLNER, OF CHICAGO, ILLINOIS.

PLUMBER'S TRAP.

1,000,087.  Specification of Letters Patent.  Patented Aug. 8, 1911.

Application filed January 18, 1911. Serial No. 603,210.

*To all whom it may concern:*

Be it known that I, PHILIP GOLLNER, a citizen of the United States, and a resident of Chicago, in the county of Cook and State of Illinois, have invented certain new and useful Improvements in Plumbers' Traps; and I do hereby declare that the following is a full, clear, and exact description thereof, reference being had to the accompanying drawings, and to the letters of reference marked thereon, which form a part of this specification.

This invention relates to an improved construction in plumbers' traps and more especially to a trap of that kind known as a "drum trap" which is used in connection with bathtubs and like fixtures, and which is arranged to extend through the floor of the bathroom or other apartment and is provided with a removable cap which may be taken off to clean out the trap.

The invention consists in the matters hereinafter described and pointed out in the appended claims.

In the accompanying drawings:—Figure 1 is a view in central vertical section of a trap embodying my invention. Fig. 2 is a plan-section taken upon line 2—2 of Fig. 1.

As shown in the accompanying drawings, the trap consists of two parts, to wit, a lower main part or body A, having the form of an upright cylinder provided with an integral bottom wall, and a tubular upper member B which is smaller in diameter than the part A, and embraces an upper cylindric portion $B^1$ which extends above the top of the main part or body A and a lower portion $B^2$, preferably of downwardly tapered form, which extends downwardly into said part A and terminates at its lower edge at a distance above the bottom wall of said part A. The trap body A is provided in its top wall with a circular opening and around said opening with an upwardly extending annular or cylindric flange or neck $a$ smaller in diameter than the cylindric wall of the body, and which surrounds or embraces the tubular upper member B. The said upper member B is adapted to extend upwardly through a hole in the floor C and is provided with a removable cap D, secured thereto by a screw-joint.

The main part or body A of the trap is provided with a lateral neck $A^1$, located at or near its top, and forming the discharge passage from the trap. Connected with said neck $A^1$ is a horizontally arranged discharge pipe E.

The upper member B of the trap is provided above the top of the main part A of the trap with a laterally extending neck $B^3$ which forms the inlet passage to the trap, and is adapted for connection therewith of an inlet pipe F, which leads from a bathtub or other fixture.

The joint between the lower and upper parts A and B of the trap is so constructed as to permit relative rotation of said parts. The purpose of this construction is to facilitate the connection of the trap, by means of the pipes E and F with the bathtub or other fixture and the main drain pipe, by arranging the said pipes E and F so that they will extend radially from the trap in different angular positions relatively to each other, as indicated in dotted lines in Fig. 2. Said necks may, therefore, extend radially from the trap in one instance to the bathtub or other fixture and in the other instance to the main drain pipe. In other words, by providing rotative connection between the lower and upper parts A and B of the trap, it becomes possible, in installing the trap, to place the necks $A^1$ and $B^3$ in such angular relation that they will be directed toward the waste outlet of the bathtub, and the main drain pipe, so that said pipes E and F may be connected up without any angles or bends therein, such as would usually be necessary if the inlet and outlet passages of the trap were in fixed relation to each other. The connection between the said parts A and B illustrated is made by means of external screw-threads in the part B, and internal screw-threads in the flange $a$ of the body A, together with a compressible packing ring or gasket H, interposed between an upwardly facing, annular bearing surface on the top of the neck $a$ and a corresponding downwardly facing surface formed on an annular, outwardly extending flange $b$ on the upper part B. Any suitable material may be used for making the compressible gasket H. Usually it will be made of lead or other soft metal. By the use of a compressible gasket, a tight joint may be formed and maintained between the parts, while, at the same time, in adjusting the upper and lower parts of the trap, the gasket will yield sufficiently to permit the upper part to be turned on the lower part, as required to bring the necks $A^1$, $B^3$ thereon in a desired angular position with respect to each other. It will, however, be understood that any other form of connection between the parts A and B may be employed, adapted to permit relative rotation of said parts while affording a tight joint between them.

The upper member B is shown as provided at its top with a horizontal flange $b^1$ between which and the outwardly extending margin of the cap D, is placed a gasket $b^2$. In this connection, it will be noted that the flange $b$ on the upper part B is made no larger in diameter than the top flange $b^1$ thereof, while the neck $B^3$ extends no farther out from the body of said part B than the outer margin of said flanges, so that after the body A is fixed in place, the upper part B may be easily removed or inserted through the hole in the floor provided for the top of the trap, making it unnecessary to take up the part of the floor adjacent to the trap in order to effect such removal or insertion.

One important advantage of the construction described is that the inlet pipe E is connected with the trap laterally at the upper part of the same, thus permitting said pipe to be made straight and nearly horizontal and making it unnecessary to cut away joists and other parts to give room for the pipes, as is required where the inlet pipe is connected with the bottom of the trap. Another important advantage of the construction described is that both the inlet and discharge pipes may extend in a straight line from the trap to the outlet of a bathtub or other fixture, and from the trap to the main drain pipe, as hereinbefore stated. Another important advantage of the construction described is that the trap may be easily cleaned by removing the cap D, or, if necessary, by removing both the said cap and the upper part B.

I claim as my invention:—

1. A drum trap comprising a lower or body member provided in its top wall with an opening, and on the upper part of its side wall with a lateral discharge neck, and an upper tubular member, smaller in diameter than said body, having a cylindric part which extends above the top of the body member, and the lower part of which extends downwardly through said opening in the top wall of the body, said cylindric upper part of the upper member being provided with a lateral inlet neck above the body and at its upper end with an outwardly extending flange forming a seat for a cap, and a cap detachably secured to the top of the upper member, said upper and lower members being connected by a joint affording relative rotative adjustment of said parts.

2. A drum trap comprising a lower or body member provided in its top wall with an opening and on the upper part of its side wall with a lateral discharge neck, and an upper tubular member having a cylindric part which extends above the body member, and the lower part of which extends downwardly through said opening in the top wall of the body, said cylindric upper part of the upper member being provided with a lateral inlet neck above the lower member, and at its upper end with a horizontal flange forming a seat for a cap, and a cap detachably secured to the top of the upper member, said upper and lower members being connected by a joint consisting of screw-threads on said parts, opposing annular bearing faces on said parts and a compressible packing ring or gasket between said bearing faces.

In testimony, that I, claim the foregoing as my invention I affix my signature in the presence of two witnesses, this 13th day of January A. D. 1911.

PHILIP GOLLNER.

Witnesses:
GEORGE R. WILKINS,
T. H. ALFREDS.